United States Patent [19]

Glotzbach

[11] Patent Number: 4,677,429
[45] Date of Patent: Jun. 30, 1987

[54] VEHICLE INFORMATION ON-BOARD PROCESSOR

[75] Inventor: Ronald W. Glotzbach, Fort Wayne, Ind.

[73] Assignee: Navistar International Transportation Corp., Chicago, Ill.

[21] Appl. No.: 556,769

[22] Filed: Dec. 1, 1983

[51] Int. Cl.$^4$ .............................................. G09G 3/00
[52] U.S. Cl. .................................. 340/711; 340/52 F; 340/521; 364/424
[58] Field of Search ............... 340/711, 715, 721, 750, 340/52 F, 517, 521, 679, 684; 364/424, 442, 464, 467

[56] References Cited

U.S. PATENT DOCUMENTS

| | | | |
|---|---|---|---|
| 3,870,818 | 3/1975 | Barton et al. | |
| 4,041,393 | 8/1977 | Reed | |
| 4,067,061 | 1/1978 | Juhasz | 364/900 |
| 4,258,421 | 3/1981 | Juhasz et al. | 364/424 |
| 4,386,406 | 5/1983 | Igarashi et al. | 364/442 |
| 4,395,624 | 7/1983 | Wartski | 377/15 |
| 4,402,048 | 8/1983 | Tsuchida et al. | 364/442 |
| 4,442,424 | 4/1984 | Shirasaki et al. | 340/715 |
| 4,462,079 | 7/1984 | Ito et al. | 364/424 |
| 4,503,528 | 3/1985 | Nojiri et al. | 367/198 |
| 4,527,241 | 7/1985 | Sheehan et al. | 364/424 |
| 4,528,687 | 7/1985 | Noso et al. | 364/424 |
| 4,550,373 | 10/1985 | Ito et al. | 364/431.04 |

FOREIGN PATENT DOCUMENTS

| | | |
|---|---|---|
| 0041741 | 10/1981 | European Pat. Off. |
| 0078015 | 12/1981 | European Pat. Off. |
| 57-50617 | 3/1982 | Japan |
| 57-146317 | 9/1982 | Japan |
| 58-143148 | 8/1983 | Japan |

Primary Examiner—Gerald L. Brigance
Assistant Examiner—Jeffery A. Brier
Attorney, Agent, or Firm—F. David AuBuchon; Dennis K. Sullivan

[57] ABSTRACT

A vehicle on-board information processing system comprising an actuating means, display unit, a recorder unit. An actuating means comprises a keyboard with numerical keys for entering the numerical data and commands into the system microprocessor and recorder for entering and retrieval of the requested data. The recorder accumulates also data from the vehicle component operation sensors retrievable by the same key commands. A rocker switch is mounted on the key pad for selecting a topic of the program and another switch selects a sub-topic and a numerical code therefor, if necessary. The driver uses only numerical information for entering and retrieval of the preprogrammed subjects, which can be modified or substituted.

20 Claims, 2 Drawing Figures

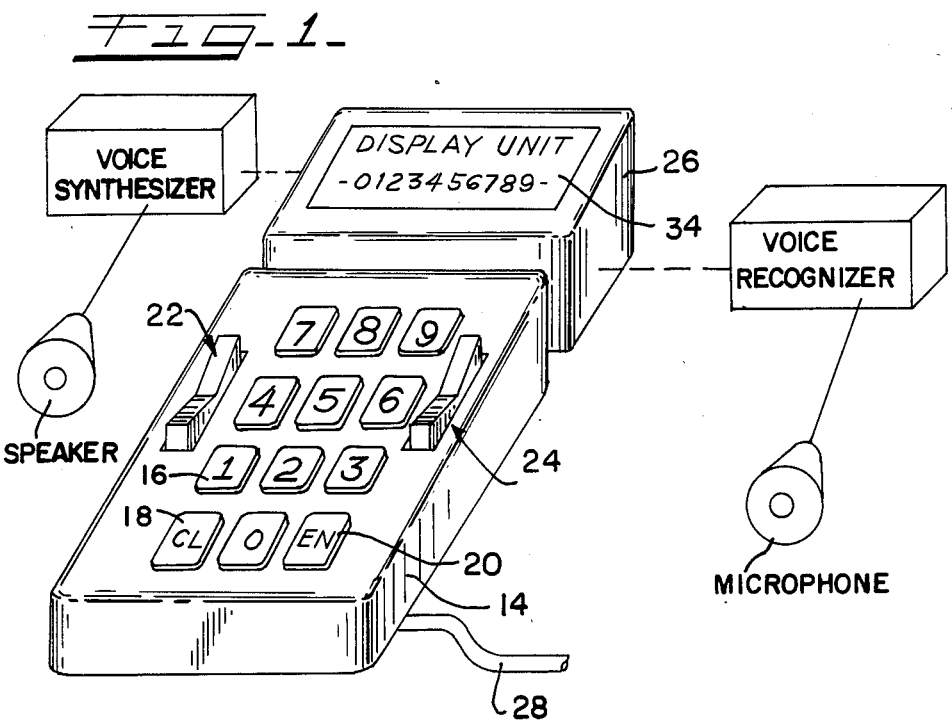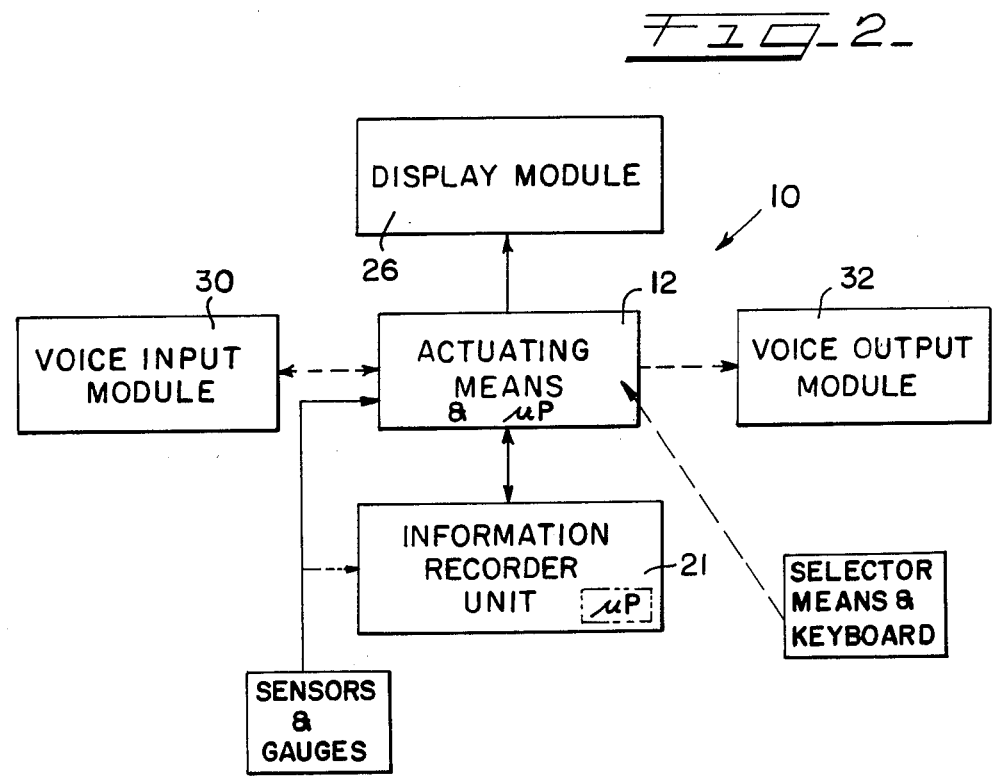

VEHICLE INFORMATION ON-BOARD PROCESSOR

BACKGROUND OF THE INVENTION

1. Field of the Invention

This invention pertains to a data processing system and more particularly to an information processing system mounted on a motor vehicle for processing the data generated by a vehicle driver and vehicle function sensors.

2. Description of the Prior Art

The below described invention is a vehicle information on-board processor which allows a vehicle operator, maintenance personnel, or others to input the data into a recorder system, or to display information gathered in a vehicle recorder system. The system is a simplified method of entering and retrieving the information from the system. Although there are numerous devices for an on-board computer responding to a specific request by a user, none of the prior art devices have the subject information processing system as described hereinbelow.

Examples of prior art systems for gathering information, displaying information and recording information relating to the operation of a vehicle are disclosed in the following patents and patent publications, the disclosures of which are incorporated herein by reference:

| Patent Publication No. | Patent Applicant | Publication Date |
| --- | --- | --- |
| U.S. Pat. No. 3,870,818 | Barton et al. | March 11, 1975 |
| U.S. Pat. No. 4,386,406 | Igarashi et al. | May 31, 1983 |
| U.S. Pat. No. 4,400,779 | Kosuge et al. | August 23, 1983 |
| U.S. Pat. No. 4,402,048 | Tsuchida et al. | August 30, 1983 |
| European Published Patent Application No. EP 41741 | Shirasaki et al. | December 16, 1981 |
| Corresponding to U.S. Pat. No. 4,442,424 | | April 10, 1984 |
| Japanese Published Patent Application No. JP 57050617 | Ito et al. | March 25, 1982 |
| Corresponding to U.S. Pat. No. 4,462,079 | | July 24, 1984 |
| Japanese Published Patent Application No. JP 57146317 | Nojiri et al. | September 9, 1982 |
| Corresponding to U.S. Pat. No. 4,503,528 | | March 5, 1985 |
| European Published Patent Application No. EP 78015 | Noso et al. | May 4, 1983 |
| Corresponding to U.S. Pat. No. 4,528,687 | | July 9, 1985 |
| Japanese Published Patent Application No. JP 58143148 | Ito et al. | August 25, 1983 |
| Corresponding to U.S. Pat. No. 4,550,373 | | October 29, 1985 |

The Barton et al U.S. Pat. No. 3,870,818 discloses a voice responsive device similar to an annunciator which includes individual circuits each capable, upon the triggering of the circuit, to generate speech synthesizing signals corresponding to a given word or phase. Such voice responsive device includes electrical circuitry connected to sensors which when the sensor senses a certain condition generates a trigger signal which activates the voice responsive device. For example, a brake fluid sensor would sense the level of brake fluid and would trigger the message "brake fluid low". Likewise, for oil pressure, for gasoline and for seat belt the respective sensors therefor, when activated, will cause the generation of the voice messages "oil pressure low", "gasoline low" or "fasten seat belt".

The Igarashi et al U.S. Pat. No. 4,386,406 discloses a fuel level measuring method and apparatus which includes a float that operates a rheostat type level sensor which is coupled to a microcomputer, the output of which is coupled to a digital display for indicating the level of fuel remaining in the fuel tank.

The Kosuge et al U.S. Pat. No. 4,400,779 discloses a method and apparatus for indicating the mileage corresponding to the remaining fuel in a tank for vehicles and utilizes a traveled distance detector and a consumed fuel quantity detector for determining distance traveled per fuel consumed and, with a microprocessor and a measurement of the fuel remaining in the fuel tank, will indicate to the driver the mileage corresponding to the remaining fuel.

The Tsuchida et al U.S. Pat. No. 4,402,048 is directed to a method and apparatus for indicating the remaining fuel in a fuel tank and discloses an apparatus very similar to the apparatus disclosed in U.S. Pat. No. 4,386,406 referred to above.

The Shirasaki et al European Published Patent Application No. EP 41741 is directed to a method and system for displaying vehicle operating parameters in a variable format and includes sensors for sensing vehicle speed, engine rpm, fuel quantity, coolant temperature, vehicle interior temperature and the exterior ambient temperature. This information is supplied to and processed by a microcomputer which has an output that is supplied to a cathode ray tube display unit. Pushbutton actuated switches corresponding to the parameters being sensed and monitored are provided so that an operator can depress a pushbutton to display a desired parameter. Furthermore, when the sensor senses a parameter out of range such as low fuel or high coolant temperature, a voice synthesizer is activated by the microcomputer to provide a vocal announcement or warning. A command signal to the microcomputer can be entered by the use of a microphone and a voice recognizer instead of by pushbutton. In this modification, the vehicle driver would give a vocal command such as by saying "fuel", "coolant temperature", etc.

The Ito et al Japanese Published Patent Application No. JP 57050617 is directed to an apparatus of information offer for agriculture operation. The apparatus includes a keyboard, a speed detector, a fuel consumption rate detector, a computer and a visual display. With this apparatus mounted on an agricultural machine, such as a tractor, the operator can input via the keyboard to the computer the working width of the agricultural field and the computer will estimate the time of completion of the agricultural work or the fuel consumption at the time of completion of the work and display this information on the visual display.

The Nojiri et al Japanese Published Patent Application No. JP 57146317 discloses a method and apparatus for controlling a vehicle and includes a microcomputer, a radio control unit, a stereo control unit and an air conditioner control unit coupled to the microcomputer. Coupled to an output of the microcomputer is a sound synthesizer and loud speaker. Also provided is a microphone and a sound recognition circuit for inputting voice commands to the microcomputer. A single pushbutton switch is mounted in the center of the steering wheel and utilized to manipulate the radio, the stereo unit or an air conditioner. The sound recognition system, including the microphone and sound recognition circuit, may be used in place of or together with the switch whereby the microcomputer can detect a "command" and responsd to instructions from the driver of the vehicle.

The Noso et al European Patent Publication No. EP 78015 discloses a spoken-instruction controlled system for an automotive vehicle and includes a voice recognition system which when, actuated a first time activates a system for controlling devices in an automobile, such as power doors and windows or a car radio. The first voice recognition activation causes an operation and a second voice recognition causes stopping of the operation.

The Ito et al Japanese Published Patent Application No. JP 58143148 discloses a temperature-feedback electronic engine control apparatus for computing various engine operating parameters, such as fuel injection amount, on the basis of input signals from a temperature sensor which detects engine temperature. Other sensors for sensing water temperature, throttle switch position, crank angle position, air fuel ratio and vehicle speed are also provided. The information gained from these sensors is supplied to a digital processing circuit. The apparatus senses temperatures before and after explosion of fuel in the cylinders of the vehicle and controls electromagnetic fuel injection relative to engine temperatures determined.

SUMMARY OF THE INVENTION

According to the present invention, the information processing system mounted on a vehicle comprises an actuating means for commanding the system to enter and retrieve the certain data. A processor means for operating the data in conformance with a preprogrammed memory means installable therein. A recorder for storing the entered data and communicating with the actuating means and a display means which reflect the generated data and commands entered by a user. The actuating means comprises a keyboard with numerical keys for entering digital information into the processing system. A selector means for searching a program with a corresponding topic being shown by the display means. The alpha-numeric display means are capable of demonstrating letter characters and numbers for identifying topics, sub-topics and the numbers identifying selected codes which are related to a predetermined list of words in numerical input and output.

BRIEF DESCRIPTION OF THE DRAWINGS

FIG. 1 is a perspective illustrative view of a keyboard, a display unit a voice recognizer and a microphone;

FIG. 2 is a schematic illustration of the vehicle information processing system.

DESCRIPTION OF THE PREFERRED EMBODIMENT

The invention may be carried into practice in a number of ways but one specific embodiment will be described by way of example.

Referring now to the drawings wherein reference characters designated like or corresponding parts throughout the several views, there is shown in FIGS. 1 and 2 a vehicle on-board information processing system 10. The data processing system 10 comprises an actuating means 12 including a keyboard 14. The keyboard 14 includes a plurality of keys 16, essentially indicating 0 through 9 digits, "Clear" and "Enter" keys, 18 and 20, respectively, for cancelling currently displayed information and transmitting the desired information into the vehicle recording unit 21.

The recording system stores the data transmitted from the actuating means 12 and from vehicle element function sensors and gauges as shown in FIG. 2. Such sensors can include, as known in the art, temperature sensors, an engine rpm sensor, a speed sensor, an oil pressure sensor, and a fuel level sensor, to name a few.

The keyboard also has two selector switches 22 and 24 which could be of a rocker or toggle type. Upon actuating the first toggle switch 22, a menu or list of the program topics will begin to appear on a display unit 26. The switch 22 allows the menu items to be stepped or scanned through in forward or reverse sequence. The second selector switch 24 allows to search sub-topics or items in the selected menu topic displayed for subsequent entry, if necessary. This second rocker switch 24 also allows items or sub-topics to be reciprocably stepped or scanned through with predetermined speed.

The keyboard 14 can be dash-mounted or remotely mounted. The information from the keyboard 14 to the recorder transmits via an electrical cable.28. The topic menu and sub-topic titles list are contained in a microprocessor in the keyboard 14, or it can be placed in the recorder 21. The actuating means communicate information displayable by the display module 26 via a cable, if the keyboard is replaced by a voice input module 30 responding to audio commands.

A voice output unit or synthesizer 32 can be an optional feature of the system and can provide for an audible signal or command that represents data being displayed. The module or voice output unit 32 can be attached to the display unit 26 or data entry actuating unit 14 remotely mounted on a cab body. It is connected to the actuating keyboard via a cable.

A display unit 26 contains an alpha-numeric display panel 34 containing LCD, LED or the like medium for illumination of data. The display unit is dash mounted with the keyboard 14 but can be remotely mounted.

A voice input unit 36, as is known in the art and as shown in FIGS. 1 and 2, can be substituted for the keyboard with keys and switches. The voice input unit 36 is synchronized with the display unit for simultaneous illumination of the command and the generated data.

In operation, the device is used to input the data to a vehicle recording system using very few key strokes. An operator presses the rocker switch number 22 to reciprocably step or scan through a preprogrammed sequence of topics in the menu. The speed is adjustable. The selected menu item will be displayed on the alpha-numeric display module 26. Optionally, the voice output module would pronounce the menu items as they are sequenced through. The user stops at the item of desired input and then presses the enter key to input this item.

One of the advantages of the above-described system is the utilization of a simple keyboard with keys for entering only numerical information, which can represent word commands. For instance, next to the words "State of Idaho" selected in the sub-topic menu, the display will indicate a numerical or digital code. Thus, the operator can plug in the code and other input data using only numerical keys.

The menu can, for example, include the following items: Fuel Tax Report Input, Driver ID, Route Designation, Load Input, Departure Location, Destination Location, Fuel Purchases, Downtime ID, Maintenance Report Input, etc.

Once the menu topic is selected and entered, a second switch 24 is used to step through the programmed input or output descriptors pertinent to the selected menu item. The sub-topic menu items can be reciprocably sequenced through the second switch. A voice module output unit 32, if used, pronounces the displayed items. The user stops at the desired sub-topic and presses the enter key to input his choice of numbers to the input device. Selected sub-topics are represented in the following samples:

Menu items: Fuel Tax Report Input

Select Sub-topic Titles: Purchased Fuel-Gallons, Purchased Fuel-Location/Date, Purchased Fuel-Price, State Line Crossing ID, Lube Oil Purchase/Price/Location/Date, etc.

The menu topics and sub-topics can be tailored to the user's requirement by a special microprocessor programming at the time of installation. Once the menu topic and sub-topics are entered, the user inputs the numeric information via the actuating keyboard. The information is then transmitted to the recorder via electrical or radio communication channels.

The menu and sub-topic items are stored in a microprocessor that can be located in the entry actuating unit 12, as shown in FIG. 2, or in the recorder unit 21, as shown in phantom in FIG. 2. The microprocessor programming can be tailored to provide the required items and formats. The microprossessor also extracts data for the display from the recorder menu in response to the user's command.

The recorder unit 21 accumulates the data entered by a vehicle operator and the data generated by a vehicle components' operation sensors and gauges, e.g., an odometer, brake wear sensor, etc. The recorded data is recalled by the command entered through the keyboard or similar actuating means.

While one embodiment of the invention has been illustrated and described herein, various changes and modifications may be made therein without departing from the spirit of the invention as defined by the scope of the appended claims.

What is claimed is:

1. An information processing system mounted in a vehicle and comprising:
   actuating means for actuating said system for entering and retrieving specified data in response to commands inputed into said actuating means;
   a microprocessor and a memory coupled to said actuating means for processing data according to a program in said memory;
   recording means coupled to said microprocessor and to said actuating means for storing the entered data inputed into said actuating means;
   alpha-numeric display means coupled to said microprocessor for displaying data retrieved from said recording means and commands entered by a user;
   a program stored in said recording means including menus of topics and subtopics and number codes corresponding to the worded topics and subtopics;
   said actuating means comprising:
   a keyboard comprising numerical keys for entering numerical information into said processing system, and
   selector means for causing, when activated, a forward or backward scan of worded topics in the menu or worded topics in a subtopic menu by said microprocessor which searches the menus and causes sequential display of each worded topic on said display means during said scan; and
   said display means including means for illustrating letter characters identifying worded topics and subtopics and numbers identifying selected worded topics in addition to illustrating numerical inputs and outputs input into said actuating means or outputed from said recording means.

2. The system according to claim 1, including vehicle component function sensors and gauges coupled to said microprocessor, and said recording means including means for storing information entered via said actuating means and other data generated by vehicle component function sensors and gauges.

3. The system according to claim 1, wherein said selector means comprises a first selector switch for scanning and searching a menu of topics and numerical codes corresponding to selected worded topics and a second selector switch for scanning and searching a menu of sub-topics under a selected topic and numerical codes corresponding to selected worded topics of said subtopic menu.

4. The system according to claim 1 wherein said actuating means comprises an audio input unit coupled with said microprocessor and said display means, said microprocessor including means for causing synchronous illustration of audio commands on said display means.

5. The system according to claim 1 including an audio output unit coupled to said microprocessor and said display means for pronouncing the data shown by said display means.

6. The system according to claim 1 wherein said menu of topics includes menus of sensors and gauges for component functions of the vehicle.

7. The system according to claim 1 wherein said menu of topics includes driver related topics.

8. The system according to claim 1 wherein said menu of topics includes trip related topics.

9. The system according to claim 1 wherein said menu of topics includes load related topics.

10. The system according to claim 1 wherein said menu of topics includes vehicle operation related topics, such as fuel and maintenance.

11. The system according to claim 1 wherein said menu of topics includes fuel tax report information, driver I.D., route destination, load information, departure location, destination location, fuel purchases, down time I.D., and maintenance report information.

12. The system according to claim 1 wherein said menu of topics includes fuel tax report information.

13. The system according to claim 12 wherein said fuel tax report information menu includes a menu of sub-topics including purchase fuel-gallons, purchase fuel-location/date, purchase fuel-price, state line crossing I.D., and lub oil purchase/price/location/date.

14. A method for processing information related to operation of a vehicle, said method comprising the steps of: sensing data related to various gauges and sensor component functions of a vehicle; storing said gauge and sensor component function data in a memory; inputing and retrieving specified other data including menus of worded topics and sub-topics and number codes corresponding to the worded topics and sub-topics; keying numerical information into the memory; scanning in a forward and backward scan the worded topics in the topic menu; scanning in a forward or backward scan the worded topics of a selected sub-topic menu; and displaying data retrieved from the memory and commands of a user in an alpha-numeric manner including the worded topics and the associated number codes for same.

15. A method for processing information related to the operation of a vehicle, said method comprising the steps of: sensing data related to various gauges and sensor component functions of a vehicle; storing said gauge and sensor component function data in a memory; inputing and retrieving specified other data comprising menus of worded topics including a menu of driver related data and sub-topics and number codes corresponding to the worded topics and sub-topics; keying numerical information into the memory; scanning in a forward or backward scan the worded topics in the topic menu; scanning in a forward or backward scan the worded topics of a selected sub-topic menu; and displaying data retrieved from the memory and commands of a user in an alpha-numeric manner including the worded topics and the associated number codes for same.

16. A method for processing information related to the operation of a vehicle, said method comprising the steps of: sensing data related to various gauges and sensor component functions of a vehicle; storing said gauge and sensor component function data in a memory; inputing and retrieving specified other data comprising menus of worded topics including a menu of trip related data and sub-topics and number codes corresponding to the worded topics and sub-topics; keying numerical information into the memory; scanning in a forward or backward scan the worded topics in the topic menu; scanning in a forward or backward scan the worded topics of a selected sub-topic menu; and displaying data retrieved from the memory and commands of a user in an alpha-numeric manner including the worded topics and the associated number codes for same.

17. A method for processing information related to the operation of a vehicle, said method comprising the steps of: sensing data relatd to various gauges and sensor component functions of a vehicle; storing said gauge and sensor component function data in a memory; inputing and retrieving specified other data comprising menus of worded topics including a menu of load related data and sub-topics and number codes corresponding to th worded topics and sub-topics; keying numerical information into the memory, scanning in a forward or backward scan the worded topics in the topic menu; scanning in a forward or backward scan the worded topics of a selected sub-topic menu; and displaying data retrieved from the memory and commands of a user in an alpha-numeric manner including the worded topics and the associated number codes for same.

18. An information processing system mounted in a vehicle and comprising:
acuating means for actuating said system for entering and retrieving specified data in response to commands inputed into said actuating means;
a microprocessor and a memory coupled to said actuating means for processing data according to a program in said memory;
recording means coupled to said microprocessor and to said actuating means for storing the entered data inputed into said actuating means;
alpha-numeric display means coupled to said microprocessor for displaying data retrieved from said recordig means and commands entered by a user;
a program stored in said recording means comprising menus of topics including a menu of driver related data and sub-topics and number codes corresponding to the worded topics and sub-topics;
said actuating means comprising:
a keyboard comprising numerical keys for entering numerical information into said processing system,
means for scanning the worded topics in the topic menu in a forward scan or backward scan, and
means for scanning the worded topics of a selected sub-topic menu in a forward scan or a backward scan; and
said display means including means for illustrating letter characters identifying worded topics and sub-topics and numbers identifying selected worded topics in addition to illustrating numerical inputs and outputs inputed into said actuating means or outputed from said recording means.

19. An information processing system mounted in a vehicle and comprising:
actuating means for actuating said system for entering and retrieving specified data in response to commands inputed into said actuating means;
a microprocessor and a memory coupled to said actuating means for processing data according to a program in said memory;
recording means coupled to said microprocessor and to said actuating means for storing the entered data inputed into said actuating means;
alpha-numeric display means coupled to said microprocessor for displaying data retrieved from said recording means and commands entered by a user;
a program stored in said recording means comprising menus of topics including a menu of trip related data and sub-topics and number codes corresponding to the worded topics and sub-topics;
said actuating means comprising: ·
a keyboard comprising numerical keys for entering numerical information into said processing system,
means for scanning the worded topics in the topic menu in a forward scan or backward scan, and
means for scanning the worded topics of a selected sub-topic menu in a forward scan or a backward scan; and
said display means including means for illustrating letter characters identifying worded topics and sub-topics and numbers identifying selected worded topics in addition to illustrating numerical inputs and outputs inputed into said actuating means or outputed from said recording means.

20. An information processing system mounted in a vehicle and comprising:
actuating means for actuating said system for entering and retrieving specified data in response to commands inputed into said actuating means;
a microprocessor and a memory coupled to said actuating means for processing data according to a program in said memory;
recording means coupled to said microprocessor and to said actuating means for storing the entered data inputed into said actuating means;

alpha-numeric display means coupled to said microprocessor for displaying data retrieved from said recording means and commands entered by a user;
a program stored in said recording means comprising menus of topics including a menu of load related data and sub-topics and number codes correspnding to the worded topics and sub-topics;
said actuating means comprising:
a keyboard comprising numerical keys for entering numerical information into said processing system, means for scanning the worded topics in the topic menu in a forward scan or backward scan, and
means for scanning the worded topics of a selected sub-topic menu in a forward scan or a backward scan; and
said display means including means for illustrating letter characters identifying worded topics and sub-topics and numbers identifying selected worded topics in addition to illustrating numerical inputs and outputs inputed into said actuating means or outputed from said recording means.

* * * * *